United States Patent [19]
Jabsen

[11] 4,208,249
[45] Jun. 17, 1980

[54] HYDRAULIC SEISMIC SUPPORT FOR NUCLEAR FUEL ASSEMBLY

[75] Inventor: Felix S. Jabsen, Lynchburg, Va.

[73] Assignee: The Babcock & Wilcox Company, New Orleans, La.

[21] Appl. No.: 861,062

[22] Filed: Dec. 15, 1977

[51] Int. Cl.² .......................... G21C 3/30; G21C 7/08
[52] U.S. Cl. .................................. 176/78; 176/36 S; 176/76
[58] Field of Search ............... 176/76, 78, 79, 81, 176/36 S

[56] References Cited
U.S. PATENT DOCUMENTS

| | | | |
|---|---|---|---|
| 3,331,749 | 7/1967 | Anthony | 176/78 |
| 3,741,868 | 6/1973 | Qurnell | 176/78 |
| 3,775,249 | 11/1973 | Clapham | 176/78 |
| 3,971,575 | 7/1976 | Lesham | 176/78 |
| 4,059,483 | 11/1977 | Anthony | 176/78 |
| 4,076,586 | 2/1978 | Bideau | 176/78 |

Primary Examiner—Samuel W. Engle
Assistant Examiner—Donald P. Walsh
Attorney, Agent, or Firm—J. M. Maguire; R. J. Edwards; D. Anthony Gregory

[57] ABSTRACT

A typical embodiment of this invention provides a hydraulic mechanism for alleviating the effect of seismic forces and other stresses that are applied to a fuel assembly in a nuclear reactor. Illustratively, hollow guide posts protrude into a fuel assembly end fitting grid from biased spring pads. Plungers that move with the spring pads plug one end of each of the respective guide posts. Plates on the end fitting grid that have individual holes for fluid discharge partially plug the other ends of the respective guide posts, thereby providing a hydraulic means for absorbing the longitudinal component of seismic shocks and other anticipated forces.

6 Claims, 3 Drawing Figures

HYDRAULIC SEISMIC SUPPORT FOR NUCLEAR FUEL ASSEMBLY

BACKGROUND OF THE INVENTION

1. Field of the Invention

This invention relates to nuclear reactors and, more particularly, to hydraulic apparatus for absorbing shocks that are applied to fuel assemblies, and the like.

2. Description of the Prior Art

To produce useful power from a nuclear reactor, it is necessary to assemble fissionable uranium in a sufficient concentration and in a physical configuration that will sustain a continuous sequence of neutron-induced fission reactions within the uranium nuclei. The heat generated through these reactions in this assembly, or reactor core, usually is absorbed in a stream of pressurized water. This heated pressurized water then is pumped to one or more heat exchangers in which the absorbed heat is transferred to secondary coolant water. It is, of course, this secondary coolant water that rises into the steam which drives the turbines, or other electrical power generating machinery.

To provide a proper concentration of uranium for the reactor core, it has often been the practice to prepare pellets of uranium dioxide. These pellets are loaded into long, slender, hollow tubes which, when the tube ends are sealed off, are referred to as fuel rods. In order to enhance the structural integrity of the reactor core, these fuel rods are arranged into subgroups, each of about two hundred fuel rods, that are called fuel assemblies. The assemblies, in turn, are mounted in a generally right circular cylindrical array to form the reactor core.

Naturally, the reactor core is environmentally hostile to the structural integrity of its component parts. The temperature, water flow velocity, pressure, radiation and the like within the reactor core all combine to place great stresses on the core materials. In addition to these environmental extremes, adequate provision also must be made to enable structural components of the reactor core to cope with other forces of a more unusual and, perhaps, of a more violent nature than those which are imposed through ordinary operating conditions. Seismic or earthquake shocks and the thermal shocks to physical structure that might attend an accident in which a significant portion of the pressurized water evaporates from or drains out of the reactor core are typical of the situations in which forces far in excess of those generated in the course of routine operation could be encountered.

The customary response to this problem is the addition, in one way or another, of more materials and more metal to the reactor core. This direct approach although probably providing the needed structural protection, has a number of undesirable features. Additional materials in the reactor core, for example, exhibit a "parasitic" effect that absorbs a portion of the neutron population within the core. Neutrons, absorbed in this manner do not contribute to the energy production and hence, are used wastefully and inefficiently.

Accordingly, there is a need for improvements to reactor core structures that will enable the core to safely attenuate or absorb shocks and other forces of unusual and major character without adding materials to the core structure that will not increase parasitical neutron losses.

SUMMARY OF THE INVENTION

These and other problems that have characterized the prior art are overcome to a large extent through the practice of the invention. Illustratively, the internal pads that brace the fuel assemblies to restrict longitudinal movement, bear against movable spring pads that are mounted on the upper end fitting of the respective fuel assemblies. At least some of these spring pads have plungers that are pinned to the respective pads. These plungers are slidably received within hollow tubular guide posts. Longitudinal slots formed in the guide posts accommodate the pins in order to permit the plungers to move in a longitudinal direction relative to the posts. The guide posts, in turn, are secured to the upper grids of the individual fuel assemblies. Within tubular guide posts, moreover, and partially blocking the open end of each of the posts are individual disk-shaped plates each with an orifice or hole.

Thus, as an earth tremor, or the like, compels the plunger and spring pad assemblies to move in a longitudinal direction relative to the respective guide posts, pressurized water within the guide posts arrests this motion. This water, squirting through the holes in the plates, permits the guide posts and spring pads to move relative to each other in a longitudinal direction at a controlled rate in which the applied forces are absorbed in a safe manner.

In accordance with a feature of the invention, however, the pin and plunger combinations, moving in a longitudinal direction through the respective hollow guide posts produce a progressive braking effect. Thus, as the pins which connect the plungers to their respective spring pads move longitudinally through the guide post slots, the pins and their associated plungers gradually block these slots, thereby continuously decreasing the discharge area through which the water within the guide post can flow. This technique provides a continuously increasing resistance to the further longitudinal relative movement of the plungers and orificed plates. The resistance increases, moreover, in a progressive manner that protects reactor core structure from sustaining severe damage that otherwise might occur through a more abrupt attenuation of imposed shocks, and the like.

Thus, there is provided in accordance with the terms of the invention an improved technique for coping with the application of major forces that might be applied to the core of a nuclear reactor while eliminating substantial quantities of parasitical neutron absorbing material from the core.

The various features of novelty which characterize the invention are pointed out with particularity in the claims annexed to and forming a part of this specification. For a better understanding of the invention, its operation and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
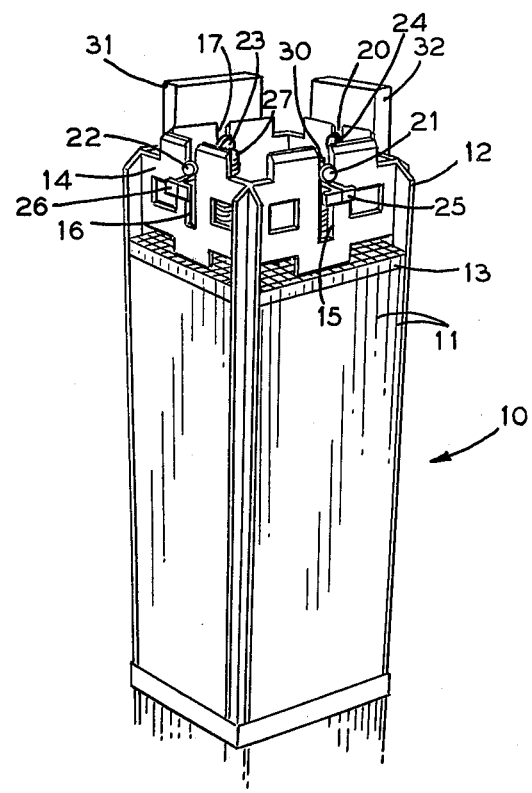
FIG. 1 is a perspective view of a portion of a fuel assembly that embodies principal features of the invention.

For a more complete appreciation of the invention, attention is invited to FIG. 1 which shows a fuel assembly 10. Comprising the fuel assembly 10 is a group of long, slender fuel rods 11, the lengthwise axes of which are arranged in a generally parallel array. One end of the fuel rods is received in an end fitting 12.

As illustrated, the end fitting 12 has a cellular grill 13 that is disposed in a direction which is transverse to the lengthwise axes of the fuel rods 11 in order to engage the ends of these rods, thereby to bear the movement of the fuel rods in a lengthwise direction.

The end fitting 12 further includes a monolithic end casting 14 that supports the cellular grill 13. As shown, the end casting 14 is generally in the shape of a hollow cube, open at its transverse ends and provided in each of the respective cube faces with lengthwise slots 15, 16, 17 and 20. The slots 15, 16, 17 and 20 are parallel with the lengthwise axes of the fuel rods 11. These slots, moreover, penetrate each of the cube faces for about two thirds of the lengthwise depth of the middle portion of these faces, as measured from the transverse end of the casting 14 that is spaced in the lengthwise direction from the grill 13. Stops 21, 22, 23 and 24 that have the general appearance of rivets are secured in the slots 15, 16, 17 and 20, respectively, at about one quarter of the slot depth, again measured from the transverse end of the casting 14 that is spaced in a lengthwise direction from the grill 13.

Spring pads 25, 26, 27 and 30, which will be described subsequently in more complete detail, protrude from the hollow interior of the end casting 14, through the respective slots 15, 16, 17 and 20 in order to enjoy a degree of travel in the lengthwise direction of the fuel rods 11 that is limited by the respective stops 21, 22, 23 and 24 and those portions of the end casting 14 that are adjacent to the cellular grill 13 and immediately below the slots.

The entire fuel assembly 10 is aligned within the reactor core (not shown in the drawing) and braced to attenuate movement in the lengthwise direction of the fuel rods 11 by means of four internal pads, of which only pads 31, 32 are shown in FIG. 1. The pads 31, 32 are secured to and depend from a transversely disposed grid (also not shown in the drawing) that spans the area above the entire reactor core. The internal pads are generally rectangularly arranged in sets of four. Each of these sets are specific to a particular one of the fuel assemblies. The internal pads, of which the pads 31, 32 are illustrative, bear against those portions of the spring pads 25, 26, 27 and 30 that protrude through the respective slots 15, 16, 17 and 20 in the faces of the end casting 14.

Figure 2:
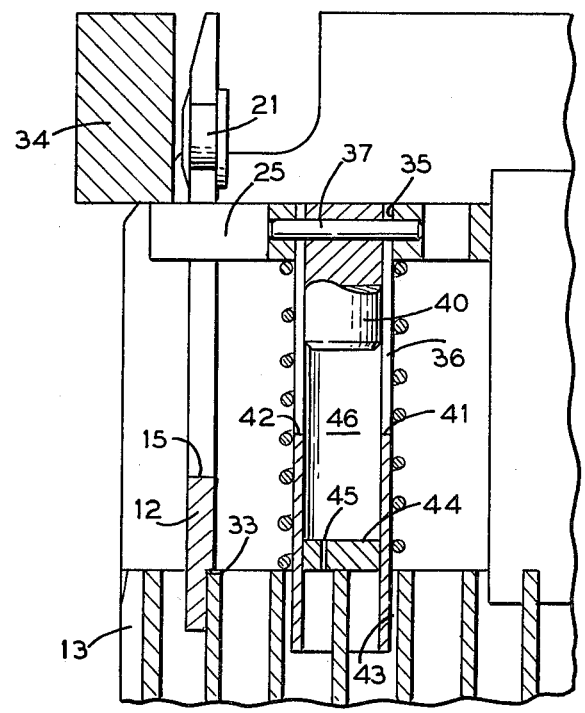
FIG. 2 is a front elevation in full section of a portion of the fuel assembly that is shown in FIG. 1.

Turning now to FIG. 2, the end casting 14 is provided with a transverse shoulder 33 that catches an edge of a portion of the cellular grill 13. As shown, the slot 15 is blocked by means of the stop 21. The portion of the spring pad 25 that protrudes through the slot 15 bears against internal pad 34 which is fixed to the grid (not shown in the drawing).

In accordance with a feature of the invention, the spring pad 25 is provided with an aperture 35. A hollow guide post 36 is received in the aperture 35 for relative movement in a lengthwise direction. A pin 37 also secures a cylindrical plunger 40 to the spring pad 25. The pin 37, moreover, secures the plunger 40 in the end of the guide post 36 in order to block the otherwise open end of the post 36. The fit between the cylindrical wall of the plunger 40 and the inner wall of the guide post 36 is sufficiently loose to permit the plunger to move freely in a lengthwise direction relative to the post but nevertheless provide a reasonably fluid-tight fit between the plunger and the wall. As illustrated, the guide post 36 is oriented with its longitudinal axis parallel with the lengthwise axes of the fuel rods 11. Guide post slots 41, 42 also are formed in the walls of the post in a longitudinal direction. The widths of these guide post slots 41, 42 are adequate to enable the pin 37 to move in a longitudinal direction relative to the guide post 36 during lengthwise movement of the post relative to the plunger 40 as described subsequent in more complete detail. The depths of these guide post slots 41, 42 moreover, are equal to about half the length of the guide post 36, the ends of the guide post slots occurring above the transverse surface of the cellular grill 13.

Illustratively, the guide post 36 protrudes into and is secured to the cellular structure of the grill 13.

As shown, portions 43 of the grill 13 are cut away to form recesses that accommodate the depth of the guide post 36 penetration into the grill 13.

A disk-shaped plate 44 is secured within the guide post 36 to the transverse surface of the cellular grill 13. The diameter of the plate 44 is gauged to plug the end of the guide post 36 in which it is lodged. An orifice 45 is formed within the plate 44 to provide a means for fluid communication between guide post volume 46 that is formed between the plunger 40 and the plate 44 and the balance of the reactor core volume.

Figure 3:
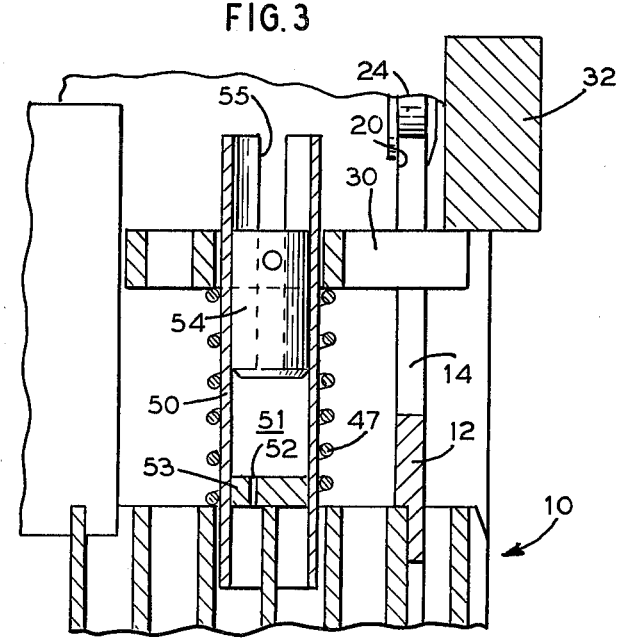
FIG. 3 is a side elevation of the portion of the fuel assembly that is shown in FIG. 1.

In operation, and, as shown in FIG. 3 by means of a companion structure within the end fitting 12 to that which was described in connection with FIG. 2, as the reactor core sustains a major seismic or other shock, a lengthwise component of this force compels the fuel assembly 10 to move toward the internal pad 32. The pad 32 bears against the portion of the spring pad 30 that protrudes from the end casting 14 through the slot 20. Not only is this movement of the fuel assembly 10 retarded through the resilient properties of coil spring 47, but also through the hydraulic forces that are generated within a guide post 50.

Thus, the pressurized water coolant in the reactor core that fills guide post volume 51 acts as a shock absorber, the water dissipating the imposed force as it flows out of the volume 51 by way of an orifice 52 in plate 53. One of the salient features of the invention, however, is the progressively decreasing discharge area that is provided by means of the relative lengthwise travel of a plunger 54 past the guide post slots, only guide post slot 55 being shown in FIG. 3. Thus, as the shock is applied initially to the reactor core, flow of water from the volume 51 is relatively unrestricted and the lengthwise motion retarding effect of the plunger and guide post combination is relatively slight. This initially slight retardation protects reactor core components from damage that otherwise would result from the abrupt application of major force to a rigid system. As the fuel assembly 10 moves in a lengthwise direction toward the internal pad 32, the plunger 54 progressively blocks the orifice provided by the guide post slot 55 and its companion slot in the guide post 50 that is out of the plane of FIG. 3. This progressive decrease in orifice area has the effect of increasing the impedance of flow from the volume 51 into the balance of the reactor core, thereby providing for a progressive attenuation of the applied force in a manner that gradually—rather than abruptly—absorbs this force. The progressive attenuation of the force in question that characterizes the invention protects the reactor core structure from possible damage that otherwise might be expected to occur if the force is applied to a rigid system.

Further with respect to the operation of the invention, after the plunger 54 has completely blocked the guide post slots, controlled fluid discharge from the chamber 51 continues through the orifice 52 in the plate 53 until the applied force is fully absorbed. In this force absorption the coil spring 47 also participates to attenuate a share of the applied shock. Clearly, the combination of the coil spring 47, the orifice 52 and the progressively changing orifice area that is provided through the cooperative effect of the plunger 54 and the associated guide post slots produce a substantially better means for coping with these forces than any one or two of these components alone, even if the capacity of the individual components is increased to absorb the entire anticipated loading, in a way, moreover that actually removes parasitical neutron absorbing material from the reactor core. Thus, the hollow guide posts that characterize this invention eliminate inefficient neutron-absorbing matter from the reactor core in a way that nevertheless enhances the structural integrity of the core.

Naturally, after the applied shock has been dissipated in the foregoing manner, the energy stored in the compressed coil spring 47 presses the fuel assembly 10 in a lengthwise direction away from the internal pad 32 unitl this motion is stopped through the action of the spring pad 30 and the stop 24. In most practical situations envisioned, it is expected that all of the shock attenuating guide posts in a reactor core structure will be involved in coping with major forces that might need to be withstood.

The embodiments of the invention in which an exclusive property or privilege is claimed are defined as follows:

1. In combination with a fuel assembly for a nuclear reactor of the type having a plurality of long and slender fuel rods, each of said rods having two ends, said rods being spaced from each other and generally parallel to each other in the lengthwise direction, the improvement comprising a cellular grill engaging one of the ends of each of the fuel rods, all of said grill engaged ends being adjacent to each other at the lengthwise rod ends, a hollow guide post coupled on one end to the grill for movement therewith, said guide post having at least one lengthwise slot-formed therein, said slot extending from the end of the guide post that is spaced from the grill through a portion of the guide post length, a plate mounted within the guide post for movement therewith, a pad disposed generally transverse to the guide post slot, said pad having an aperture formed therein to receive the guide post and to accommodate movement of the guide post in a lengthwise direction relative to said pad, and a plunger within the guide post and secured to the pad, said plunger progressively blocking and unblocking the guide post slot in response to relative motion between the plunger and the guide post.

2. A fuel assembly according to claim 1 further comprising spring means circumscribing said guide post, said spring means being interposed between said grill and said pad.

3. A fuel assembly according to claim 1 wherein said plate further comprises an orifice formed therein to establish fluid communication through said plate in said lengthwise direction.

4. A fuel assembly according to claim 2 wherein said plate further comprises an orifice formed therein to establish fluid communication through the plate.

5. In combination with a fuel assembly for a nuclear reactor of the type having a plurality of long and slender fuel rods, each of said rods having two ends, said rods being spaced from each other and generally parallel to each other in the lengthwise direction, the improvement comprising a cellular grill engaging one of the ends of each of the fuel rods, all of said grill engaged ends being adjacent to each other at the lengthwise rod ends, a hollow guide post coupled on one end to the grill for movement therewith, said guide post having at least one lengthwise slot-formed therein, said slot extending from the end of the guide post that is spaced from the grill through a portion of the guide post length, a pad disposed generally transverse to the guide post slot, said pad having an aperture formed therein to receive the guide post and to accommodate movement of the guide in a lengthwise direction relative to the pad, and a plunger within the guide post and secured to the pad, said plunger progressively blocking and unblocking the guide post slot in response to relative motion between the plunger and the guide post.

6. A fuel assembly according to claim 5 further comprising a plate mounted within the guide posts having an orifice to establish fluid communication through the plate.

* * * * *

UNITED STATES PATENT AND TRADEMARK OFFICE
CERTIFICATE OF CORRECTION

PATENT NO. : 4,208,249
DATED : June 17, 1980
INVENTOR(S) : Felix S. Jabsen

It is certified that error appears in the above-identified patent and that said Letters Patent are hereby corrected as shown below:

Column 5, line 30 "unitl" should be --until--

Column 6, line 41, after the word guide insert --post--.

Signed and Sealed this

Fourth Day of November 1980

[SEAL]

Attest:

SIDNEY A. DIAMOND

Attesting Officer

Commissioner of Patents and Trademarks